US008582186B2

(12) United States Patent
Demmeler

(10) Patent No.: US 8,582,186 B2
(45) Date of Patent: Nov. 12, 2013

(54) DEVICE FOR INPUTTING ONE OR SEVERAL VALUE DOCUMENTS

(75) Inventor: Erwin Demmeler, Memmingen (DE)

(73) Assignee: Giesecke & Devrient GmbH, Munich (DE)

( * ) Notice: Subject to any disclaimer, the term of this patent is extended or adjusted under 35 U.S.C. 154(b) by 230 days.

(21) Appl. No.: 13/264,315

(22) PCT Filed: Apr. 13, 2010

(86) PCT No.: PCT/EP2010/054839

§ 371 (c)(1), (2), (4) Date: Oct. 13, 2011

(87) PCT Pub. No.: WO2010/119037

PCT Pub. Date: Oct. 21, 2010

(65) Prior Publication Data

US 2012/0038956 A1 Feb. 16, 2012

(30) Foreign Application Priority Data

Apr. 14, 2009 (DE) ......................... 10 2009 017 411

(51) Int. Cl.
*H04N 1/04* (2006.01)

(52) U.S. Cl.
USPC ............ 358/498; 358/497; 358/496; 358/474

(58) Field of Classification Search
USPC ................................. 358/498, 497, 496, 474
See application file for complete search history.

(56) References Cited

U.S. PATENT DOCUMENTS

| | | | | |
|---|---|---|---|---|
| 6,428,000 | B1 | 8/2002 | Hara et al. | |
| 6,830,400 | B2 * | 12/2004 | Yerg nson | 400/693 |
| 6,908,244 | B2 | 6/2005 | Cook et al. | |
| 2002/0066992 | A1 | 6/2002 | Lim et al. | |

FOREIGN PATENT DOCUMENTS

| | | | |
|---|---|---|---|
| DE | 3441977 | | 5/1985 |
| DE | 29622921 | | 10/1997 |
| EP | 1821265 | | 8/2007 |
| GB | 2150122 | | 6/1985 |
| GB | 2150122 | A | 6/1985 |
| WO | 9804484 | | 2/1998 |
| WO | 0163566 | A1 | 8/2001 |
| WO | 2008096425 | A1 | 8/2008 |
| WO | 2008139584 | A1 | 11/2008 |

OTHER PUBLICATIONS

International Search Report in PCT/EP2010/054839, Sep. 20, 2010.

* cited by examiner

*Primary Examiner* — Houshang Safaipour
(74) *Attorney, Agent, or Firm* — Workman Nydegger

(57) ABSTRACT

Described is an apparatus for inserting one or more value documents and to a device for accepting or processing value documents having such an apparatus. The solution of the problem is based on an apparatus for inserting one or more value documents, including an insertion apparatus for inserting the individual value document or several value documents and a separator connected to the insertion apparatus for detecting one value document at a time. The insertion apparatus includes at least two parts connected to each other in a movable manner, wherein the first part in a first position forms a continuous supporting surface together with the second part for inserting several securities, and wherein the first part in a second position for inserting an individual security is removed from the area of the supporting surface.

8 Claims, 1 Drawing Sheet

DEVICE FOR INPUTTING ONE OR SEVERAL VALUE DOCUMENTS

BACKGROUND OF THE INVENTION

1. Field of the Invention

The present invention relates to a device for inputting one or several value documents and an apparatus for accepting or processing value documents having such a device.

2. Related Art

Value documents are understood in this connection to be sheet-shaped objects that represent for example a monetary value or an authorization and hence should not be producible arbitrarily by unauthorized persons. Hence, the value documents have features that are not easily produced, in particular not easily copied, whose presence is an indication of authenticity, i.e. production by an authorized body. Important examples of such value documents are coupons, vouchers, checks and in particular bank notes. Moreover, the value documents can have added thereto so-called separation or header cards which can contain information about the value documents. Said information can relate to the number and total value of the value documents, but also information about a depositor of the value documents, such as his account number.

For accepting value documents there are increasingly used at least semi-automatically operating apparatuses, for example corresponding bank machines, payment terminals, etc. For automatic processing there are employed bank-note processing machines for checking and/or for sorting the value documents. In so doing, single or several value documents are supplied which the respective apparatus accepts and processes further. For example, the value document can be drawn into a housing of the apparatus, transported past at least one sensor and thereby checked by the latter as to type or value and authenticity and, upon recognition of authenticity according to a specified criterion, transported into a storage device and stored there. The value given by the stored value document can then be credited to an account of the user or employed for paying an invoice amount. It is also possible that goods or a voucher or data are issued to the user after the deposit of a specified minimum amount, as is known for example from vending machines.

To be able to attain a reliable recognition of type and/or authenticity simply by means of the sensor, it can be advantageous that the value document is oriented in a specified fashion relative to the sensor. For example, there can be provided a lateral orientation by which a specified value-document edge extending parallel to the transport direction of the value document must be located in a specified narrow area of the sensor. When several value documents are input simultaneously, it must moreover be ensured that only one value document after the other is always grasped and transported past the sensor. The previously mentioned orientation is also important in the case of the input of several value documents. A good orientation of the value documents is also advantageous for transport and storage.

SUMMARY OF THE INVENTION

The present invention is hence based on the object of providing a device for inputting one or several value documents which permits a simple insertion of one or several value documents to be accepted.

The achievement of the object starts out from a device for inputting one or several value documents which has an input device for inputting the single value document or several value documents, and a singler following the input device for grasping one value document at a time.

According to the invention, the input device is formed by at least two movably interconnected parts, whereby the first part in a first position forms together with the second part a continuous supporting surface for the input of several papers of value, and whereby the first part in a second position for the input of a single paper of value is removed from the area of the supporting surface.

The invention thereby makes it possible both to input several papers of value simultaneously and single them automatically by means of the singler reliably one after the other, and to input single papers of value for singling, whereby the reduction of the size of the supporting surface makes it easier and ergonomically more favorable to insert single papers of value reliably in the area of the singler, thereby ensuring that singly inserted papers of value can also be singled well.

BRIEF DESCRIPTION OF THE DRAWINGS

Further advantages will result from the dependent claims and the subsequent description of an embodiment of the invention with reference to figures.

There are shown

DETAILED DESCRIPTION OF PREFERRED EMBODIMENTS OF THE INVENTION

Figure 1:
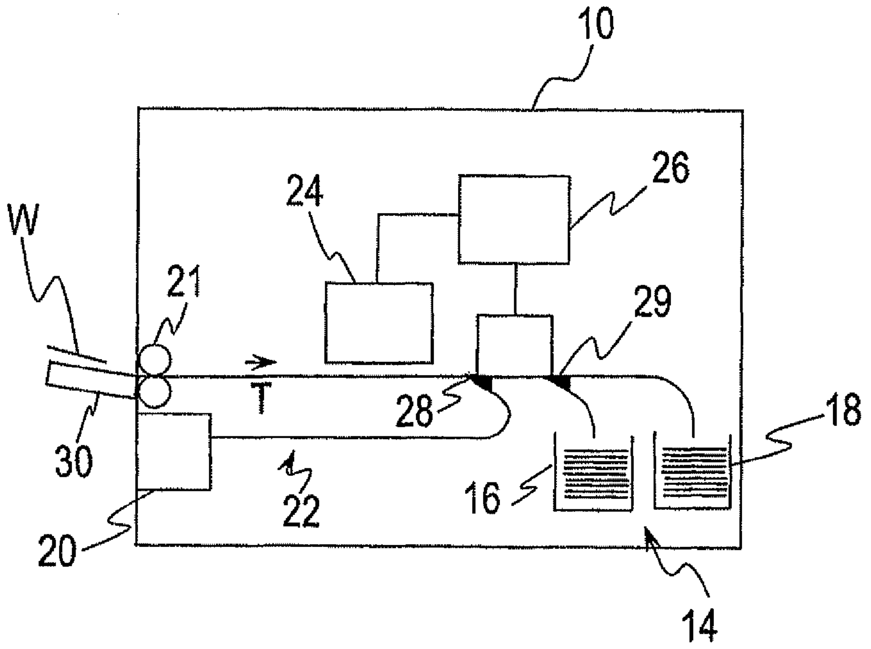
FIG. 1 a schematic view of a value-document accepting apparatus having an input device, FIG. 2 a schematic view of the input device from FIG. 1 for inputting several value documents, and FIG. 3 a schematic view of the input device from FIG. 1 for inputting a single value document.

In FIG. 1, an apparatus for accepting value documents W, in the example bank notes, possesses in a housing 10 in a first opening an input device 30 for inputting bank notes, a storage device 14 having in the example at least two stores 16 and 18 for storing bank notes, an output 20 arranged in a further opening of the housing 10 for outputting bank notes, and a transport apparatus 22, shown only roughly schematically, for transporting bank notes present in singled form from the input device 30 along a transport path to the stores 16, 18 of the storage device 14 and/or the output 20. A checking device 24 for checking the type, in particular the denomination, and the authenticity of input bank notes on the basis of specified criteria and emitting corresponding check signals is arranged on the transport path after the input device 30. A control device 26 is connected via a signal connection to the checking device 24 and emits in dependence on signals received from the checking device 24 actuating signals to the transport apparatus 22 for adjusting the transport path for the checked bank note.

The transport apparatus 22 has several partly driven rollers, and belts guided thereover and driven between which a bank note to be transported is transported, and gates 28 and 29 to branches of the transport path which are controlled by the control device 26.

Upon operation of the apparatus, a user places one or several bank notes into the input device 30, whereupon the bank note or bank notes are drawn in singly by a singler 21. They are then transported by the transport device 22 further to the checking device 24 by which they are checked.

When for example it is ascertained by checking device 24 that an accepted bank note either does not have a specified type, for example a specified denomination, according to the specified criteria or is not to be considered authentic according to the specified criterion, it emits corresponding signals to the control device 26, which thereupon controls the transport apparatus 22, more precisely the gate 28, in such a way that the checked bank note is transported directly into the output 20 and returned.

Otherwise, the checking device 24 emits to the control device 26 a signal which represents the denomination of the bank notes checked and recognized as authentic according to the specified criteria. The control device 26 then emits actuating signals to the transport apparatus 22, more precisely its gates 28 and 29, upon which the gates 28 and 29 are so adjusted that the bank notes are transported into one of the stores 16, 18 which is provided for bank notes at least of the ascertained denomination. Further, the control device 26 registers in a per se known manner the value of the accepted and stored bank note. The ascertained value of the accepted bank notes can then for example be output by the control device 26 via a display device not shown and/or be credited to the account of the depositor. Instead of a storage it can also be provided that accepted bank notes are e.g. destroyed by means of a shredder, for example because they are greatly soiled and therefore no longer fit for circulation.

To facilitate the input of one or several bank notes for the depositor or operator and to make possible a good singling which ensures inter alia a faultless functioning of the sensor, the input device 30 is configured such that it can be set up e.g. by the operator for the input of a single or several bank notes.

Figure 2:
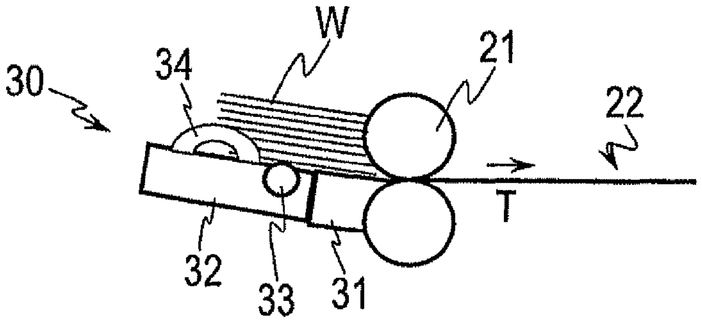

In FIG. 2 the input device 30 is depicted upon the input of several bank notes W. The input device 30 consists of at least two parts 31, 32. The first part 32 located on the outside from the point of view of the singler 21 is connected movably to the second part 31, for example by means of a hinge. The first part 32 of the input device can thereby be rotated, swiveled or moved in another way such that in a first position it forms together with the second part 31 a continuous supporting surface for receiving the bank notes W.

In the first position of the first part 32 of the input device 30 it can moreover be provided that one or several feed rollers 33 arranged in the first part 32 are driven. The feed rollers 33 are driven together with and in synchronism to the singler 21 and support the singling of the bank notes W by moving the respective lowermost bank note W in transport direction T towards the singler 21, making it possible for said bank note to be grasped by the singler 21 and singled.

Further, it can be provided in the first position that directing elements 34 are present which project beyond a surface of the first part 32 forming the supporting surface. The bank notes W to be input are placed between the directing elements 34 onto the surface co-forming the supporting surface, so that the directing elements 34 are located on the left and right of the stack of bank notes W in order to guide the bank notes W and to effect an oriented draw-in of the bank notes W by the singler 21.

Figure 3:
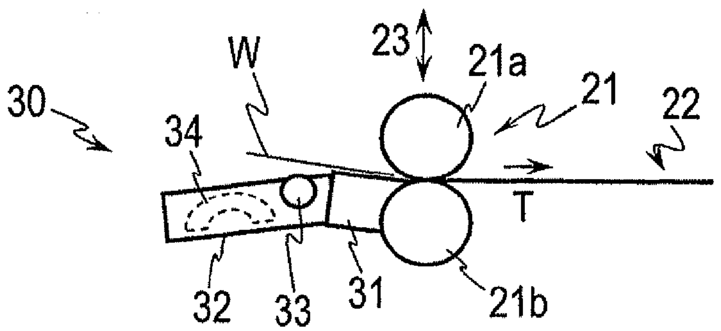

In FIG. 3 the input device 30 is depicted upon the input of a single bank note W. The first part 32 of the input device has been moved from the first position depicted in FIG. 2 to a second position, so that the first part 32 is removed from the area of the supporting surface.

The single bank note W can thus be input by the operator and brought into the grasping area of the singler 21 substantially more easily and ergonomically more favorably.

In the second position of the first part 32 of the input device 30 it can moreover be provided that the drive of the feed rollers 33 is switched off. This can be effected for example for safety reasons, in order that the operator cannot injure himself upon the input of the single bank note W.

Further, it can be provided in the second position that the directing elements 34 are countersunk into the first part 32, so that the directing elements 34 do not hinder the input of the single bank note W by the operator.

In the second position the singler 21 can also be operated in a different mode from the first position. In particular, the singler 21 can ensure in the second position for the input of single bank notes that a greater gap arises between two bank notes.

The different operating modes described for the first and second positions can be triggered by the device having end switches which are actuated in the first and second positions, respectively. The switches can be connected to the control device 26 which controls for example a drive motor of the feed rollers 33. Likewise, it is possible for the directing elements 34, controlled by the control device 26, to be countersunk or moved out for example hydraulically or by electric motor. In addition, it is also possible to change the described different operating modes mechanically upon the motion of the first part 32 from one to the other position.

For controlling the singling or for starting the drive or drives of the singler 21, of the feed rollers 33 and of the transport device 22, there can be present in the second part 31 of the input device 30 a light barrier which recognizes the input of one or several bank notes W. The signals of the light barrier can be evaluated by the above-described control device 26 in order to control the described functions.

The described design of the input device 30 from two parts 31, 32 is advantageous because the second part 31 of the input device 30 ensures that upon the input of a single bank note there is also made available a certain supporting surface which makes it possible for the single bank note also to be input in reliable and well oriented fashion. However, it is evident that a one-part input device 30 can also be employed. The input device 30 is then moved out of the area of the supporting surface directly in the area before the singler 21 in order to facilitate the input of the single bank note.

Bank notes frequently cause problems upon input if they are in a poor state, being in particular greatly damaged, limp or worn. Such bank notes are frequently damaged further or completely destroyed by the singler 21 upon singling and thereby lead to problems such as jamming and blockage of the singler 21. These problems result from the singler 21 consisting of a retaining element 21*a* and a singling element 21*b* which together form a singling gap through which the bank notes are transported and singled.

To be able to input such bank notes without further damage, it can be provided in particular in the second position for the input of a single bank note that the singler gap can be widened. For this purpose, the retaining element 21*a* can for example be adjustable 23 such that the singler gap is widened. The retaining element 21*a* can in so doing also be raised so far that the retaining element 21*a* exerts no more force whatsoever on a bank note to be input. A bank note to be input is then grasped substantially directly by the transport device 22 and transported.

The described input device 30 can be employed both for the input of bank notes in transverse format, i.e. the bank notes are singled and transported parallel to their narrow edges, and in longitudinal format, i.e. the bank notes are singled and transported parallel to their long edges. In so doing it need only be heeded that the size of the supporting surface is dimensioned accordingly.

The invention claimed is:

1. A device for inputting one or several value documents, comprising an input device arranged to input a single value document or several value documents, and a singler following the input device arranged to grasp one value document at a time, said input device comprising at least first and second movably interconnected parts, the first part forming in a first position together with the second part a continuous supporting surface for the input of several documents of value, and the first part in a second position for the input of a single paper of value being removed from the area of the supporting surface.

2. The device according to claim 1, wherein the first and second parts of the input device are interconnected with a hinge.

3. The device according to claim 1, wherein the first part of the input device comprises one or several feed rollers.

4. The device according to claim 3, wherein the feed rollers are driven when said first part is in said first position and are not driven when said first part is in said second position.

5. The device according to claim 1, wherein the first part of the input device has directing elements that guide several value documents.

6. The device according to claim 5, wherein the directing elements, when the first part is in the first position, project beyond a surface of the first part forming the supporting surface, and when the first part is in the second position, the directing elements are countersunk into the first part.

7. The device according to claim 1, wherein the singler comprises a retaining element and a singling element which together form a singler gap which can be changed by adjustment of the retaining element and/or the singling element, so that the change causes the retaining element to exert a reduced or no force on a paper of value to be input.

8. An apparatus for accepting or processing value documents comprising the device for inputting one or several value documents as recited in claim 1, a transport device arranged to transport value documents from the singler to at least one store and a checking device arranged along the transport device that ascertains the type and/or the authenticity of an accepted value document.

* * * * *